United States Patent [19]

Scheckenbach et al.

[11] Patent Number: 5,670,569
[45] Date of Patent: Sep. 23, 1997

[54] CROSSLINKED MOLDING COMPOSITIONS COMPRISING POLYARYLENE SULFIDES AND POLYARYLENE SULFOXIDES, PROCESS FOR THEIR PREPARATION AND THEIR USE

[75] Inventors: Helmut Scheckenbach, Langen; Andreas Schleicher, Beselich, both of Germany

[73] Assignee: Hoechst Aktiengesellschaft, Germany

[21] Appl. No.: 577,234

[22] Filed: Dec. 22, 1995

[30] Foreign Application Priority Data

Dec. 23, 1994 [DE] Germany .......................... 44 46 495.9

[51] Int. Cl.$^6$ .................... C08K 3/20; C08F 283/00
[52] U.S. Cl. ................ 524/500; 524/609; 525/537; 528/388
[58] Field of Search ............. 525/537; 528/388; 524/609, 500

[56] References Cited

U.S. PATENT DOCUMENTS

| | | | |
|---|---|---|---|
| 3,326,865 | 6/1967 | Smith | 260/79.3 |
| 4,383,080 | 5/1983 | Dupree | 525/537 |
| 5,496,917 | 3/1996 | Fleischer et al. | 528/388 |
| 5,593,594 | 1/1997 | Strutz et al. | 210/660 |

FOREIGN PATENT DOCUMENTS

| | | | |
|---|---|---|---|
| 0091088 | 10/1983 | European Pat. Off. | |
| 0388970 | 9/1990 | European Pat. Off. | |
| 0435243 | 7/1991 | European Pat. Off. | |
| 623 638 A1 | 11/1994 | European Pat. Off. | 525/537 |
| 0 623 639 | 11/1994 | European Pat. Off. | 525/537 |
| 96/05246 | 2/1996 | WIPO | |

OTHER PUBLICATIONS

Allen, G., et al, *Comprehensive Polymer Science*, vol. 5, Pergamon Press, 1989, pp. 543–560.

*Primary Examiner*—Mark D. Sweet
*Attorney, Agent, or Firm*—Connolly and Hutz

[57] ABSTRACT

Mixtures comprising polyarylene sulfides and polyarylene sulfoxides or partially oxidized polyarylene sulfides containing sulfoxide groups can be thermally crosslinked in a targeted manner depending on sulfoxide content. A process for producing crosslinked polyarylene sulfide moldings is based on the use of the mixtures in the thermal shaping.

18 Claims, No Drawings

CROSSLINKED MOLDING COMPOSITIONS COMPRISING POLYARYLENE SULFIDES AND POLYARYLENE SULFOXIDES, PROCESS FOR THEIR PREPARATION AND THEIR USE

The invention relates to mixtures comprising polyarylene sulfides and polyarylene sulfoxides which form (partially) crosslinked homogeneous molding compositions at certain temperatures, a process for their preparation and their use.

Polyarylene sulfides are known, as are possible ways of crosslinking them. Thus, polyphenylene sulfides can be crosslinked by "curing". One way of doing this is by means of a melt process in which the polymers are heated continuously above their crystallite melting point for a relatively long period in the presence of air. This heating results in an increase in the melt viscosity and darkening of the polymer. On the other hand, polyphenylene sulfides can be crosslinked just below their melting point in the presence of air. This "solid-state curing" is particularly suitable for converting relatively large amounts of polymer in bulk. In general, this process takes place at temperatures of 175°–280° C. This results in an increase in the molecular weight and the melt viscosity (G. Allen, J. C. Berington, Comprehensive Polymer Science, Volume 5, Pergamon Press, 1989, 543–560).

Furthermore, polyarylene sulfides can be crosslinked by means of ozone (EP-A 0 091 088). In this process, the surface of the polymer is brought into contact with a hot gas mixture which can contain oxygen or air in addition to ozone.

Disadvantages of the abovementioned processes for cross-linking or curing are the long reaction times required for crosslinking, and also the limited controllability of the crosslinking process.

It is therefore an object of the invention to avoid the disadvantages mentioned.

The invention provides polymer mixtures comprising:
(A) from 1 to 99% by weight, preferably from 2.5 to 98.5% by weight and in particular from 5 to 98% by weight, of at least one polyarylene sulfide and
(B) from 1 to 99% by weight, preferably from 1.5 to 97.5% by weight and in particular from 2 to 95% by weight, of at least one polyarylene sulfoxide,
where the percentages by weight are based on the sum of the components (A) and (B).

The invention also provides a process for preparing crosslinked or partially crosslinked molding compositions containing polyarylene sulfide, which comprises heating a partially or completely oxidized polyarylene sulfide containing sulfoxide groups, or a mixture or a blend containing at least one polyarylene sulfide and at least one polyarylene sulfoxide or a partially or completely oxidized polyarylene sulfide containing sulfoxide groups, to temperatures in the range from 280° to 400° C., preferably to a temperature in the range from 280° to 380° C.

By means of these polymer mixtures it is possible to obtain crosslinked molding compositions consisting of polyarylene sulfides or crosslinked molding compositions comprising polyarylene sulfide, with the crosslinking being controllable and proceeding within short reaction times.

Polyarylene sulfides, also known as polyarylene thioethers, are polymers containing at least one arylene sulfide unit (—A—S—; A=Arylene radical, S=sulfur). Arylenes are, for example, phenylene, biphenylene (—$C_6H_4$—$C_6H_4$—), naphthylene which may be singly or multiply substituted. Substituents are, for example, straight-chain, cyclic or branched $C_1$–$C_{20}$-hydrocarbon radicals such as $C_1$–$C_{10}$-alkyl radicals, e.g. methyl, ethyl, n-propyl, iso-propyl, n-butyl, t-butyl or n-hexyl, or $C_6$–$C_{14}$-aryl radicals, e.g. phenyl or naphthyl; halogens, sulfonic acid, amino, nitro, cyano, hydroxy or carboxyl groups.

Polyarylene sulfoxides are polymers containing at least one arylene sulfoxide unit (—Ar—SO—; Ar=arylene radical, SO=sulfoxide group).

Polyarylene sulfides, in particular polyphenylene sulfide, can be prepared on the basis of the reaction of dihalogenated aromatics with sodium sulfide by the method of EDMONDS and HILL. Polyarylene sulfides and their preparation are described in "Ullmann's Encyclopedia of Industrial Chemistry", Volume A21, B. Elvers, S. Hawkins and G. Schulz (Eds.), VCH, Weinheim-New York 1992, pp. 463–472), which is incorporated by way of reference. The synthesis of polyarylene sulfides containing sulfone groups is described in Chimia 28(9), (1974) 567, which is likewise incorporated by way of reference.

Polyarylene sulfoxides can be obtained by oxidation of polyarylene sulfides using suitable processes. The preparation of polyarylene sulfoxides can be carried out, for example, by oxidation with ozone, as described in the German Patent Application No. P 43 14 736.4 filed on May 4, 1993, having the title "Oxidation of polyarylene sulfides", which is incorporated by way of reference.

The oxidation of the polyarylene sulfides can be carried out in such a way that only part of the sulfide bridges is converted into sulfoxide groups (incomplete oxidation, for example by use of substoichiometric amounts of oxidizing agent). Such oxidation products are included under the term polyarylene sulfoxides. The oxidation conditions (temperature, ozone concentration) can also be matched in such a way that sulfone bridges are formed in addition to sulfoxide bridges.

Polyarylene sulfones and polysulfones are polymers containing at least one arylene sulfone unit (—A—$SO_2$—; A: arylene radical, $SO_2$: sulfone group). Polyarylene sulfones can be prepared, for example, by oxidation of polyarylene sulfides by means of hydrogen peroxide or per-acids. The preparation of polyarylene sulfones is described, for example, in DE 43 14 738 A1, which is incorporated by way of reference.

Polysulfones are described in "Encyclopedia of polymer science and engineering", Volume 13, Wiley, New York 1988, pp. 196–211, keyword "Polysulfones", which is incorporated by way of reference.

The term polyarylene sulfone used here includes polysulfones.

The mixtures according to the invention can contain customary additives, for example thermal stabilizers, UV stabilizers, antistatic agents, flame retardants, dyes, pigments, inorganic and/or organic fillers and also lubricant additives such as molybdenum disulfide or graphite.

The mean particle size ($D_{50}$) of the constituents (A) and (B) of the mixture is generally in the range from $0.3 \times 10^{-6}$ to $500 \times 10^{-6}$ m, preferably from $1 \times 10^{-6}$ to $300 \times 10^{-6}$ m and in particular from $10 \times 10^{-6}$ to $200 \times 10^{-6}$ m. The polyarylene sulfoxide, namely the component (B), should be very fine. In the case of the component (A), the particle size is of lesser importance and a coarse material is generally sufficient.

The mixtures according to the invention are generally prepared from the individual components in mixers suitable for this purpose.

In the process of the invention, the mixture is processed into moldings by known methods (e.g. injection molding, hot pressing, extrusion, blow molding) in suitable apparafuses at temperatures of from 280° C. to 400° C., preferably from 280° to 380° C., with crosslinking taking place in the process. These moldings are homogeneous and, owing to their degree of crosslinking, have a higher heat resistance than uncrosslinked moldings.

Mixtures according to the invention can lead to a bubble-containing or foamed molding owing to the presence of polyarylene sulfoxides (B). To obtain a bubble-free molding, the following procedure can, for example, be used:

a) Polyarylene sulfide and polyarylene sulfoxide are melted together in an extruder at temperatures above about 310° C. (e.g. 320° C.), with the polyarylene sulfoxide and the polyarylene sulfide reacting with one another and thus forming crosslinks. The product formed in this way contains bubbles or is foamed depending on the proportion of sulfoxide. The cooled product is processed into granules. The granules can subsequently be processed at temperatures below 310° C. (e.g. at 300° C.) to give a bubble-free molding.

b) Polyarylene sulfide and polyarylene sulfoxide can also be melted together in an extruder at temperatures up to about 310° C. (e.g. 300° C.) without foam or bubble formation, with the degree of crosslinking obtained being less than in the case of a thermal treatment above 310° C.

The degree of crosslinking can be controlled by means of the proportion of polyarylene sulfoxide, component (B), or

|  | Polyphenylene sulfide [% by weight] | Polyphenylene sulfoxide [% by weight] |
|---|---|---|
| Example 1 | 90 | 10 |
| Example 2 | 75 | 25 |
| Example 3 | 50 | 50 |
| Example 4 | 25 | 75 |
| Comparative example 1 | 100 | — |
| Comparative example 2 | — | 100 |

Thermoanalytical studies were carried out on these mixtures.

DSC instrument: DSC-7 (manufacturer: Perkin-Elmer, Überlingen, Federal Republic of Germany)

Measurement conditions: Atmosphere: nitrogen Heating/cooling rate: 20° C./min Temperature program (all examples) 1st heating from 50° C. to 380° C., cooling from 380° C. to 50° C., 2nd heating from 50° C. to 380° C. In addition, Example 3 was also studied using the following temperature program (Example 3b): 1st heating from 50° C. to 320° C., Cooling from 320° C. to 50° C., 2nd heating from 50° C. to 320° C.

The results obtained are shown in Table 1

|  | 1st heating | | | Cooling | | 2nd heating | |
|---|---|---|---|---|---|---|---|
|  | Enthalpy [J/g] | Melting peak [°C.] | Exotherm [°C.] | Enthalpy [J/g] | Recrystallization peak [°C.] | Enthalpy [J/g] | Melting peak [°C.] |
| Ex. 1 | 43 | 298 | 369 | −42 | 207 | 29 | 278 |
| Ex. 2 | 35 | 298 | 367 | −8 | 207 | 22 | 277 |
| Ex. 3a | 19 | 296 | 369 | 0 | —[1] | 0 | —[1] |
| Ex. 4 | 7 | 299 | 368 | 0 | —[1] | 0 | —[1] |
| Ex 3b (320° C.) | 21 | 297 | —[1] | −30 | 225 | 16 | 282 |
| Comparison Ex. 1 | 50 | 297 | —[1] | −50 | 232 | 52 | 283 |
| Comparison Ex. 2 | —[1] | —[1] | 368 | —[1] | —[1] | —[1] | —[1] |

[1]not present by means of the content of sulfoxide groups in a partially oxidized polyarylene sulfide and can be varied as desired.

EXAMPLES

The polyphenylene sulfide (A) used has a density of 1.35 g/cm³.

The polyphenylene sulfoxide (B) used was the product prepared as described in Example 1 of the abovementioned DE-A 43 14 736.

The mean particle size ($D_{50}$) of the constituent (A) of the mixture was about $20 \times 10^{-6}$ m, the mean particle size of the constituent (B) of the mixture was about $60 \times 10^{-6}$ m.

The mixtures were mixed in a Diosna mixer (manufacturer: Dierks & Söhne, Osnabrück, Federal Republic of Germany).

The following mixtures were prepared:

It can be seen from Examples 1 to 4 that the enthalpy decreases with increasing proportion of polyphenylene sulfoxide. Likewise, a decrease in the enthalpy from the 1st to the 2nd heating is observed. The recrystallization peak of the mixtures 1 to 4 appears at lower temperatures or is not present at all in contrast to comparative example 1. This shows that a crosslinking reaction of the polyphenylene sulfide has taken place. This crosslinking reaction can be accurately controlled by means of the proportion of polyphenylene sulfoxide and takes place very rapidly, since it can already be observed in the 1st heating in the DSC.

We claim:

1. A polymer mixture comprising
   (A) from 1 to 99% by weight of at least one polyarylene sulfide consisting essentially of (—S—A—) as repeating units in said polyarylene sulfide, and
   (B) from 1 to 99% by weight of at least one polyarylene sulfoxide consisting essentially of (—SO—A—) as repeating units in said polyarylene sulfoxide, both calculated on total weight of the polymer mixture and wherein A is an arylene radical.

2. The mixture as claimed in claim 1, wherein the proportion of the component (A) is from 2.5 to 98.5% by weight.

3. The mixture as claimed in claim 1, wherein the proportion of the component (A) is from 5 to 98% by weight.

4. The mixture as claimed in claim 1, wherein the proportion of the component (B) is from 1.5% to 97.5% by weight.

5. The mixture as claimed in claim 1, wherein the proportion of the component (B) is from 2 to 95% by weight.

6. The mixture as claimed in claim 1, wherein the component (A) is a linear or branched polyphenylene sulfide.

7. The mixture as claimed in claim 1, wherein the component (B) is a linear or branched polyphenylene sulfoxide.

8. The mixture as claimed in claim 11, which contains a thermal stabilizer, a UV stabilizer, antistatic agent, a flame retardant, a pigment, an inorganic filler, an organic filler or a mixture thereof.

9. The mixture as claimed in claim 1, wherein the mean particle size $D_{50}$ of the component (B) of the mixture is in the range from $0.3 \times 10^{-6}$ to $500 \times 10^{-6}$ m.

10. The mixture as claimed in claim 1, wherein the mean particle size $D_{50}$ of the component (B) of the mixture is in the range from $1 \times 10^{-6}$ to $300 \times 10^{-6}$ m.

11. The mixture as claimed in claim 1, wherein the mean particle size $D_{50}$ of the component (B) of the mixture is in the range from $10 \times 10^{-6}$ to $200 \times 10^{-6}$ m.

12. A polymer mixture comprising (A) from 1 to 99% by weight of at least one polyarylene sulfide consisting essentially of (—S—A—) as repeating units in said polyarylene sulfide, and (B) from 1 to 99% by weight of at least one partially oxidized polyarylene sulfoxide, both calculated on total weight of the polymer mixture and wherein A is an arylene radical.

13. A process for preparing a crosslinked or partially crosslinked molding composition, which comprises heating the mixture as claimed in claim 1 to temperatures in the range from 280° to 400° C.

14. The process as claimed in claim 13, wherein the mixture is heated to temperatures in the range from 280° to 380° C.

15. A process for preparing a crosslinked or partially crosslinked molding composition, which comprises heating the mixture as claimed in claim 12 to temperatures in the range from 280° to 400° C.

16. The process as claimed in claim 15, wherein the mixture is heated to temperatures in the range from 280° to 380° C.

17. A method for preparing a crosslinked or partially crosslinked shaped molding comprising polyarylene sulfide by shaping the polymer mixture as claimed in claim 1 to obtain said shaped molding.

18. A method for preparing a crosslinked or partially crosslinked shaped molding comprising polyarylene sulfide by shaping the polymer mixture as claimed in claim 12 to obtain said shaped molding.

* * * * *